(12) United States Patent
Wangler et al.

(10) Patent No.: US 9,796,507 B2
(45) Date of Patent: Oct. 24, 2017

(54) LATCHING REMOVABLE CAN HANDLE

(71) Applicants: Eric J Wangler, Rochester, NY (US); David P Prior, Rochester, NY (US)

(72) Inventors: Eric J Wangler, Rochester, NY (US); David P Prior, Rochester, NY (US)

(73) Assignee: Jaccard Corporation, Rochester, NY (US)

( * ) Notice: Subject to any disclaimer, the term of this patent is extended or adjusted under 35 U.S.C. 154(b) by 0 days.

(21) Appl. No.: 15/057,623

(22) Filed: Mar. 1, 2016

(65) Prior Publication Data

US 2017/0253379 A1    Sep. 7, 2017

(51) Int. Cl.
| B65D 25/28 | (2006.01) |
| A47J 45/07 | (2006.01) |
| A47G 23/02 | (2006.01) |

(52) U.S. Cl.
CPC ...... *B65D 25/2829* (2013.01); *A47G 23/0266* (2013.01); *A47J 45/07* (2013.01); *B65D 2525/285* (2013.01)

(58) Field of Classification Search
CPC ....... A47G 23/0266; A47J 45/07; A47J 45/10; B65D 25/2829; B65D 2525/285
USPC ..................... 294/29, 31.1, 32, 34
See application file for complete search history.

(56) References Cited

U.S. PATENT DOCUMENTS

| 2,010,317 A | 6/1934 | Olson | |
| 2,288,359 A | 9/1940 | Jenkins | |
| 2,396,479 A | 1/1945 | Votaw | |
| 2,905,500 A | 11/1957 | Thombs | |
| 3,024,057 A | 12/1959 | Lockwood | |
| 3,076,223 A | 2/1963 | Reichold | |
| 3,261,633 A * | 7/1966 | Sakuta | A47G 23/0266 294/16 |
| 3,261,635 A * | 7/1966 | Talay | A47G 23/0266 215/396 |
| 3,305,261 A | 2/1967 | Swanke | |
| 4,993,675 A * | 2/1991 | Walker | A47G 23/0266 220/737 |
| 6,102,458 A | 8/2000 | Scace | |
| 6,266,849 B1 * | 7/2001 | Petit | B44D 3/14 16/425 |
| 7,604,270 B1 | 10/2009 | McCarthy | |

FOREIGN PATENT DOCUMENTS

WO    WO 2014/082174    *  6/2014

* cited by examiner

*Primary Examiner* — Dean J Kramer
(74) *Attorney, Agent, or Firm* — Law Office of John C. McMahon

(57) ABSTRACT

A latching removable can handle includes an elongated handle, a lower retainer structure to engage a lower rim of a can, and an upper attachment mechanism to releasably engage an upper rim of the can and including latch member mounting structure. The attachment mechanism includes a single latch member directly engaged with the mounting structure which and movable between a released position and a latched position. The attachment mechanism may include a lock member movable between an unlocked position and a locked position in which it retains the latch member in its latched position.

15 Claims, 4 Drawing Sheets

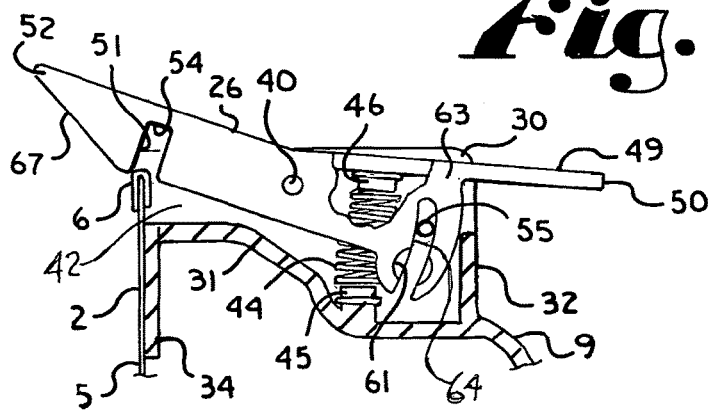
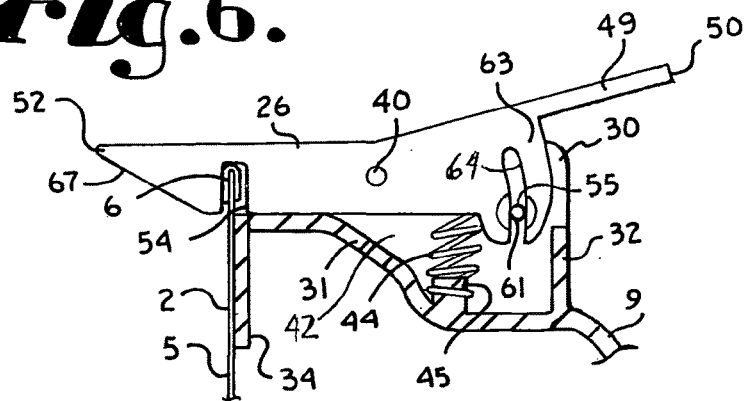
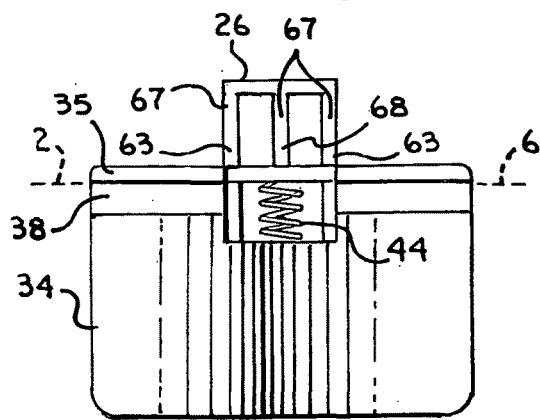
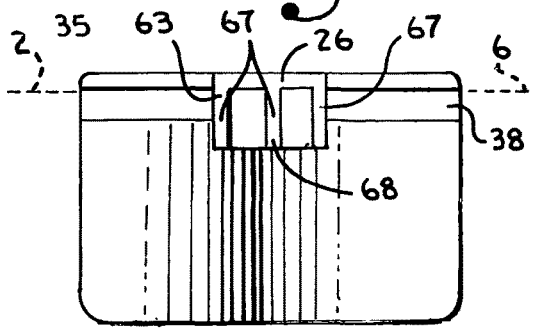

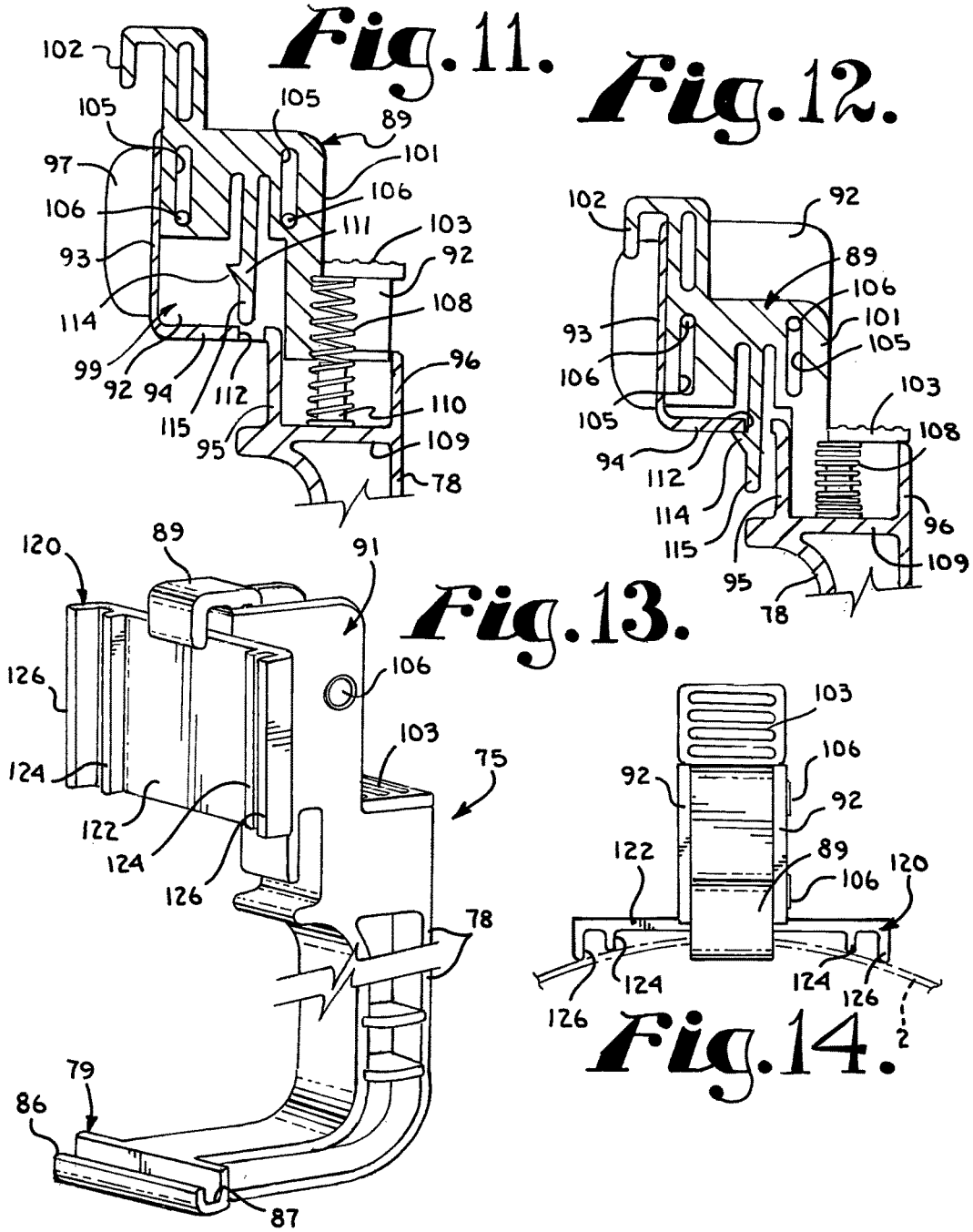

LATCHING REMOVABLE CAN HANDLE

BACKGROUND OF THE INVENTION

The present invention is broadly concerned with improvements in container handling and, more particularly, to an improved can handle which can be conveniently attached to and released from a large can.

Numerous foods are packaged in metal cans, sometimes referred to as tin cans or tins, although modern food cans are usually made of steel alloys while beverage cans are usually made of aluminum alloys. Cans for individual portions or for several portions are easily handled by most adults. Cans for restaurants and institutional food services are usually much larger. A typical size of can commonly used in such service is referred to as a "number 10" size can. According to the Can Manufacturers Institute (www.cancentral.com), a standard number 10 can has a diameter and height of 6.1875 by 7 inches (about 15.72 by 17.78 cm) and has a volumetric capacity to hold 109.43 avoirdupois ounces (about 6.84 lb or 3.102 kg) of water at 68° F. (20° C.). Such a large and heavy container can be difficult to handle by a cook or food service worker with smaller hands. Additionally, can openers often leave sharp metal edges, such that opened cans can present hazards to food service workers handling them.

Various types of apparatus or handle devices have been developed for temporary attachment to large types of cans, such as food cans, paint cans, fuel cans, and the like to facilitate manipulation of the cans. Some types of handle devices are complex and require the tightening of fasteners such as screws or nuts to secure the device to a can. Such an arrangement is undesirable in a restaurant or institutional kitchen where efficiency in preparing meals and dishes is required. Other types make use of springs which do not securely attach the handles.

What is needed is a handle device which can be secured to a large container or can which is simple and quick to attach and detach and which attaches securely to the can to avoid waste of the contents of the can.

SUMMARY OF THE INVENTION

The present invention provides embodiments of an improved handle apparatus for releasable attachment to a large container or can to facilitate manipulation of the can.

An embodiment of a handle apparatus for releasable attachment to a container having opposite upper and lower ends includes: an elongated handle member adapted to be manually grasped and having opposite handle ends; a lower retainer positioned at a lower end of the handle member to engage a first end of a container; a single latch member engaged directly with the handle member at an upper end of the handle member to enable movement of the latch member relative to the handle member between a released position and a latched position; and the latch member having an upper retainer positioned to engage the upper end of the container in the latched position of the latch member.

In an embodiment of the handle apparatus, the latch member is pivotally connected to the handle member to enable pivotal movement of the latch member between the released position and the latched position; and a resilient member is engaged between the latch member and the handle member and normally biases the latch member toward only one of the latched position or the released position of the latch member.

The latch member may be adapted to enable deployment to the latched position upon engagement of the upper end of the handle member with a side or edge of a container. For this purpose, the latch member may include a cam surface positioned and oriented to enable deployment of the latch member to the latched position upon engagement of the second end of the handle with an end of a container.

In an embodiment of the handle apparatus, the handle apparatus may include a latch mechanism engaged between the latch member and the handle member to releasably retain the latch member in the latched position thereof to thereby releasably attach the handle apparatus to a container. The latch mechanism may include a lock member engaged with the handle member and movable between a locked position and an unlocked position. The lock member may be moved to the locked position thereof to the latch member in the latched position thereof to releasably retain the latch member in the latched position and to an unlocked position to enable the latch member to be selectively moved between the latched position and the released position thereof.

In an embodiment of the handle apparatus, the latch member may be slidably engaged with the handle member to enable sliding movement between the released position and the latched position. The latch mechanism may include a pawl positioned on the latch member or the handle member and a strike plate or strike the other member with the pawl and strike cooperating to releasably retain the latch member in the latched position.

In an embodiment of the handle apparatus, the handle member may include a stabilizer pad positioned at an upper end of the handle member to engage a container to reduce movement of the handle with respect to such a container. The stabilizer pad may have a cylindrical curvature to match the curvature of the can with which it is to be used. Alternatively, the stabilizer pad may be planar in shape with sets of ribs extending toward the can and having lengths from the pad to engage the cylindrical surface of the can.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

BRIEF DESCRIPTION OF THE DRAWINGS

FIG. 5 is a fragmentary side elevational view of the handle apparatus with a side wall broken away and showing a pivotal latch member in a release position to clear a rim of a can.

FIG. 6 is a view similar to FIG. 5 and shows the pivotal latch member in a latch position thereof.

FIG. 7 is an inner end view of the handle apparatus with an inner end of the pivotal latch member in the release position shown in FIG. 5.

FIG. 8 is a view similar to FIG. 7 and shows the inner end of the pivotal latch member in the latch position shown in FIG. 6.

FIG. 11. is an enlarged fragmentary cross sectional view of the modified handle apparatus illustrating a sliding latch in a release position.

FIG. 12. is a view similar to FIG. 11 and shows the sliding latch in a latch position.

FIG. 13. is an enlarged perspective view of a second modified handle apparatus illustrating details of a modified contact pad of the apparatus.

FIG. 14. is a top plan view of the second modified handle apparatus illustrating engagement of components of the contact pad with a fragment of a can shown in phantom lines.

DETAILED DESCRIPTION OF THE INVENTION

Figure 1:
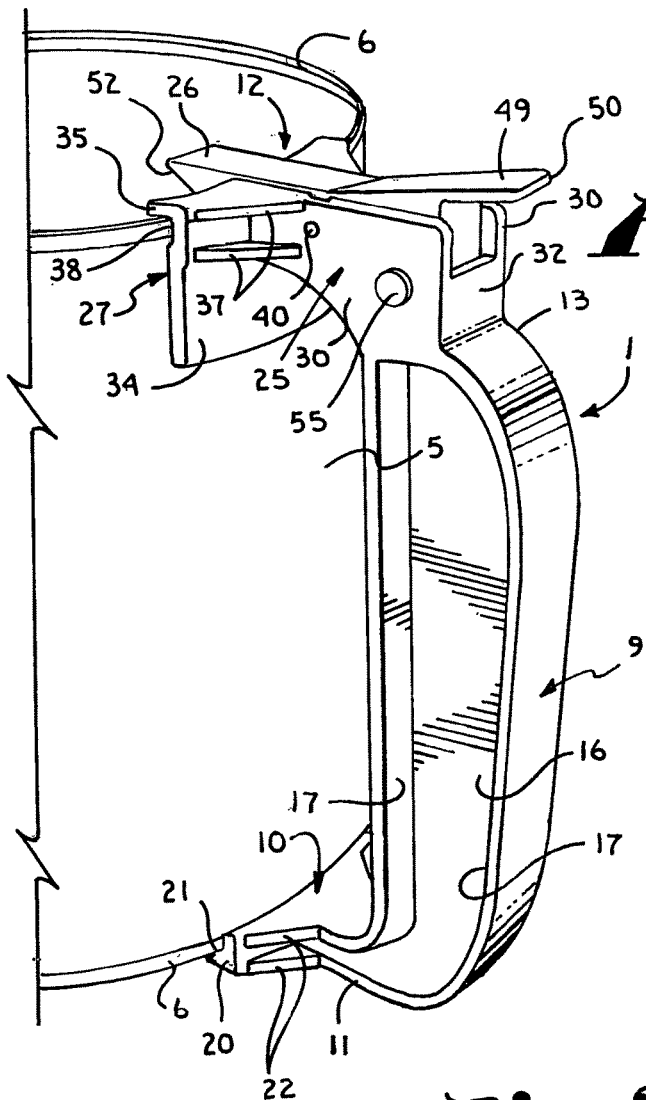
FIG. 1 is a perspective view of an embodiment of a latching removable can handle apparatus according to the present invention illustrated as attached to lower and upper rims of a can.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a latching removable can handle apparatus according to the present invention, shown in FIGS. 1-8. The handle apparatus 1 is adapted for secure, temporary attachment to a large container or can 2 to facilitate grasping and manipulating the can.

The illustrated can 2 is cylindrical in shape and has a cylindrical can wall 5 and upper and lower rims 6 which extend above upper and lower can walls (not shown). The illustrated can 2 may be a conventional "number ten" size can, as described above. It is also foreseen that the apparatus 1 could be adapted for use with other sizes of cans and rimmed containers having shapes other than cylindrical.

The apparatus 1 includes an elongated handle member 9 having a lower retainer structure 10 at a lower end 11 of the handle member 9 and an upper attachment mechanism 12 at an upper end 13 of the handle member 9. The illustrated handle member 9 has I-beam type of construction including an elongated, planar handle web 16 and handle flanges 17 extending from opposite surfaces of an edge of the web 16. The web and flange construction of the handle member 9 provides desired strength and stiffness to the handle apparatus 1.

The illustrated lower retainer structure 10 includes a laterally extending, lower rim track 20 having an upwardly opening rim groove 21 to receive the lower rim 6 of the can 2. Preferably, the track 20, or at least the rim groove 21, are curved with a radius suitable to match the curvature of the lower rim 6. The structure 10 may include gussets 22 extending between flanges 17 of the handle member 9 and the lower rim track 20.

The upper attachment mechanism 12 includes latch mounting structure 25 for a latch member 26 which cooperates with static can engaging structure 27 to releasably secure the apparatus 1 to the can 2. The illustrated latch mounting structure 25 includes a pair of laterally spaced side walls 30, a lower wall 31 (FIGS. 5 and 6), and a rear wall 32, all extending from the upper end 13 of the handle member 9. The illustrated static can engaging structure 27 includes a stabilizer pad 34 extending laterally from the side walls 30. The illustrated stabilizer pad 34 has a cylindrical shape with a curvature to match the curvature of the wall 5 of the can 2. The pad 34 has an upper rim flange 35 extending radially inward from the cylindrical pad 34. Sets of vertically spaced gussets 37 may be provided between the side walls 30 and the stabilizer pad 34. The stabilizer pad 34 may have a shallow rim relief groove 38 (FIGS. 7 and 8) on the inner surface thereof to accommodate the upper rim 6 of the can 2.

The illustrated latch member 26 is pivotally connected directly to the latch mounting structure 25 by a pivot pin 40 extending between the side walls 30 which enables the latch member 26 to rock or pivot between a latched position (FIG. 6) and a released position (FIG. 5). The side walls 30, lower wall 31, and rear wall 32 form a latch member cavity 42 (FIGS. 5 and 6) within which the latch member 26 is positioned. In the illustrated apparatus 1, the latch member 26 is biased toward the latched position (FIG. 6) by a resilient member, such as a coil spring 44 which extends between a handle post 45 extending upwardly from the lower wall 31 and a latch member post 46 extending downwardly from the latch member 26.

The latch member 26 has a thumb lever 49 at a handle end 50 of the latch member, extending away from the can 2, and a retainer surface 51 (FIG. 5) formed at a can end 52 of the latch member 26, opposite the thumb lever 49. The latch member 26 is pivoted from the latched position (FIGS. 6 and 8) to the released position (FIGS. 5 and 7) by pivoting the thumb lever 49 downward, as by using the thumb. The spring 44 is positioned in relation to the pivot 40 that when the thumb lever 49 is released, the spring 44 urges the latch member 26 into the latched position (FIG. 6). In the illustrated latch member 26, the retainer surface 51 is formed by a rim notch 54 formed in the can end 52 of the latch member 26. When the stabilizer pad 34 is placed in contact with the can wall 5, the notch 54 captures the rim 6 in the latched position of the latch member 26, with the retainer surface 51 engaging an inner surface of the rim 6.

Figure 3:
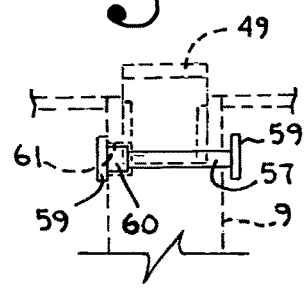
FIG. 3 is a fragmentary rear elevational view of the handle apparatus, shown in phantom lines, and illustrating the cross-bolt latch retainer in a latch retaining position thereof.
Figure 2:
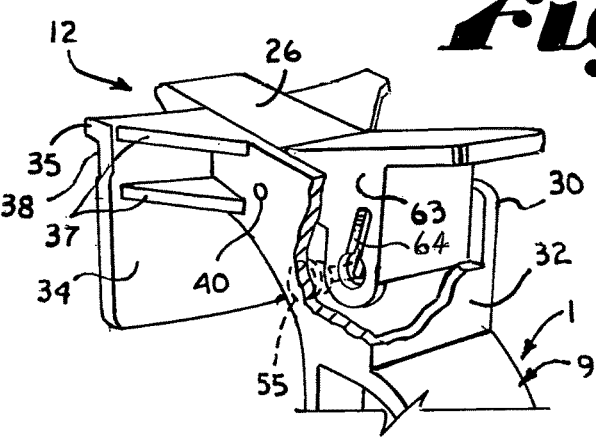
FIG. 2 is a fragmentary perspective view of the handle apparatus with a portion broken away to illustrate details of a cross-bolt latch retainer of the apparatus.
Figure 4:
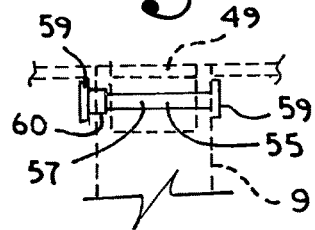
FIG. 4 is a view similar to FIG. 3 and shows the cross-bolt latch retainer in a latch release position thereof.
Figure 9:
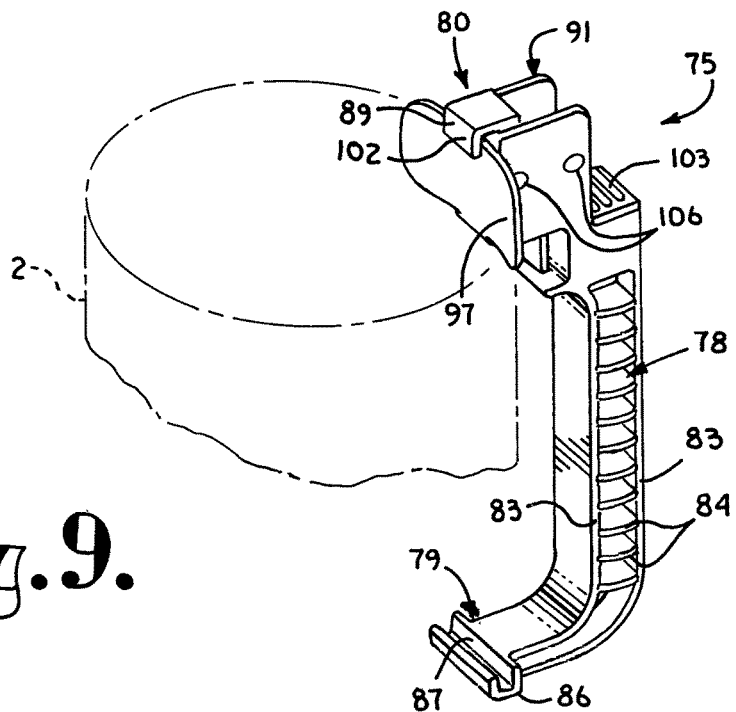
FIG. 9. is an inner perspective view of a modified embodiment of a latching removable can handle apparatus according to the present invention with a fragment of a can shown in phantom lines.
Figure 10:
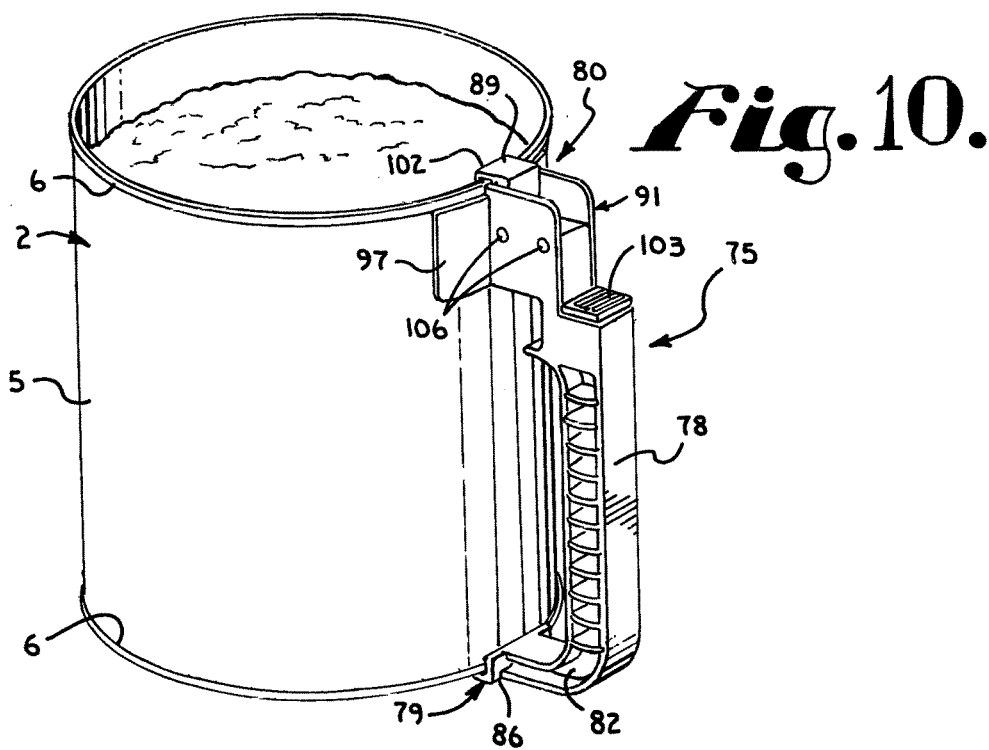
FIG. 10. is a outer perspective view of the modified handle apparatus, shown engaged with a can.

The force of the spring 44 is generally strong enough to retain handle apparatus 1 on the can 2, whereby the can 2 may be safely manipulated. However, the illustrated apparatus 1 includes a lock member 55 which may be deployed to prevent the latch member 26 from being moved to the release position, either by thumb pressure on the thumb lever 49 or by the weight of contents within the can 2. Referring particularly to FIGS. 3 and 4, the illustrated lock member 55 has the form of a cross bolt type of member. The lock member 55 includes an elongated lock rod 57 having discs 59 at opposite ends thereof. One of the discs 59 includes a cylindrical lock plug 60 which is sized to be received in a cylindrical lock recess 61 (FIGS. 2, 5, and 6) formed into a surface of one of a pair of spaced apart side walls 63 of the latch member 26. The side walls 63 also have curved slots 64 formed therein to provide for clearance of the side walls 63 past the rod 57 of the lock member 55.

When the latch member 26 is in the latched position (FIG. 6), the lock recess 61 aligns with an axis of the lock member 55, such that the lock member 55 can be pushed to seat the lock plug 60 into the lock recess 61 in a locked position of the lock member 55 (FIG. 3). This prevents the latch member 26 from being pivoted to the released position. Lateral movement of the lock member 55 to unseat the lock plug 60 from the lock recess 61 to an unlocked position (FIG. 4) enables the latch member 26 to be freely moved from the latched position to the released position.

In order to facilitate attachment to a can 2, the handle apparatus 1 is adapted to enable self-latching of the latch member 26. For this purpose, the can end 52 of latch member 26 has a cam surface or surfaces 67 (FIGS. 5 and 6) which, upon engagement with the upper rim 6, causes the latch member 26 to pivot up toward the released position so that the notch 54 can engage and snap over the rim 6 of the can 2. The cam surfaces 67 are angled surfaces formed on can ends of the side walls 63. The latch member 26 may include a center wall 68 positioned between the side walls 63 (FIGS. 7 and 8) which is provided with a cam surface 67.

To quickly attach the handle apparatus 1 to a can 2, the can 2 is tilted up slightly to enable the lower rim track 20 to be placed underneath the lower rim 6 of the can 2. The handle apparatus 1 is then pivoted toward the can 2 to engage the cam surfaces 67 with the upper rim 6 of the can, causing the latch member 26 to pivot toward the released position and enabling the notch 54 to snap over the upper rim 6 and the latch member to pivot to the latched position. The lock member 55 can then be moved laterally to the locked position to retain the latch member 26 in the latched position, with the handle apparatus 1 secured to the can 2. The handle apparatus 1 can be removed by sliding the lock member 55 to the unlocked position and pivoting the latch member 1 to the released position using thumb pressure and enabling the apparatus 1 to be removed from the can 2.

The components of the apparatus 1, except the spring 44, may be formed from any suitable material, such as a sturdy structural polymer. The spring 44 is preferably formed from a suitable spring metal, such as a steel alloy.

FIGS. 9-14 illustrate a modified embodiment 75 of the handle apparatus according to the present invention. The modified handle apparatus 75 includes an elongated handle member 78 having a latch retainer structure 79 at a lower end and an upper attachment mechanism 80 at an upper end. The handle member 78 may be substantially similar to the handle member 9, being formed of a central web 82 with flanges 83 extending therefrom. The illustrated handle member 78 includes vertically spaced ribs 84 which are joined with the web 82 and flanges 83. The ribs 84 further stiffen the handle member 78 and also provide a more rounded feel to the handle member. The lower retainer structure 79 is similar to the lower retainer structure 10 and includes a lower rim track 86 having a rim groove 87 formed therein. Preferably, the rim groove 87 is curved to match the curvature of the lower rim 6 of the can 2. Alternatively, the rim groove 87 may be wide enough the accommodate a segment of the lower rim 6.

In contrast to the pivoting latch member 26 of the apparatus 1, the handle apparatus 75 includes a latch member 89 which slides vertically relative to the handle member 78 between a released position (FIG. 11) and a latched position (FIG. 12). The upper attachment mechanism 80 includes latch mounting structure 91 including laterally spaced side walls 92, an upper front wall 93, a lower wall or strike plate 94, a lower front wall 95, and a rear wall 96. The side walls 92, lower front wall 95, and rear wall 96 extend from an upper end of the handle member 78. The upper front wall 93 may be formed in part by a stabilizer pad 97, illustrated in FIGS. 9 and 10 as having a cylindrical curvature to match the curvature of the wall 5 of the can 2.

The latch member 89 directly engages the latch mounting structure 91 and is slidably mounted within a latch mounting cavity 99 (FIG. 11) formed by components of the latch mounting structure 91 for telescoping movement therein. The illustrated latch member 89 includes a central body 101 with a rim engaging retainer or hook 102 extending thereabove and a thumb pad 103 extending rearwardly therefrom. The body 101 has a pair of spaced apart, vertically extending guide slots 105 through which pass a pair of guide pins 106 extending between the side walls 92 of the latch mounting structure 91. The guide slots 105 and guide pins 106 cooperate to restrict the latch member 89 to linear movement, without a tendency to pivot.

The latch member 89 is biased toward the released position by a resilient member or compression spring 108 engaged between a lower surface of the thumb pad 103 and an upper wall 109 of the handle member 78. The spring 108 may be sleeved onto a guide post 110 (FIG. 11) extending upwardly from the upper handle wall 109.

The upper attachment mechanism 80 is provided with means to releasably lock the latch member 89 in the latched position thereof. Referring to FIGS. 11 and 12, the latch member body 101 has an elongated pawl lever 111 extending downward therefrom toward an opening 112 in the lower wall 94 of the latch mounting structure 91. The pawl lever 111 has a pawl tooth or pawl 114 positioned on a surface facing toward the can 2 to be engaged. The pawl lever 111 may be integral or monolithic with the latch body 101 and is somewhat resilient whereby it is biased to return to its original position if moved. The pawl lever 111 is aligned with the opening 112 in the lower wall 94, which forms a strike plate or strike for the pawl 114.

When the latch member 89 is pushed toward the latch position thereof by pressure on the thumb pad 103, the pawl lever 111 is extended through the opening 112. As the pawl 114 moves through the opening 112, contact between the pawl 114 and the lower wall or strike 94 cams the pawl lever 111 away from the edge of the strike 94 until the pawl 114 is completely past the strike 94, at which location the pawl lever 111 resiliently angles back to its original position, locking the pawl 114 beneath the strike 94. The pawl 114 is positioned along the pawl lever 111 so that it catches on the strike 94 just as the rim retainer 102 engages the upper rim 6 of the can 2. A lower segment of the pawl lever 111 extending below the pawl 114 forms a release lever 115. When the latch member 89 is in the latched position, it may be released by pressure on the release lever 115, as by use of the index finger, to angle the pawl 114 out of engagement with the strike 94, allowing the spring 108 to urge the latch member 89 back to the released position.

Most components of the modified handle apparatus 75 may be made of any suitable material, such as a sturdy polymer. The spring 108 and guide pins 106 may be made of suitable metal alloys. It is also foreseen that the guide pins 106 could, alternatively, be formed of a polymer.

FIGS. 13 and 14 illustrate the modified handle apparatus 75 with a modified stabilizer pad assembly 120. The assembly 120 includes a stabilizer pad 122 which is planar in shape and has parallel sets of inner ribs 124 and outer ribs 126 extending vertically thereon. The outer ribs 126 have greater lengths from the stabilizer pad 122 than the inner ribs 124 (FIG. 14) to approximate the cylindrical curvature of the can 2 to be engaged. In other respects, the apparatus 75 with the modified stabilizer pad assembly 120 is substantially similar in construction and function to the apparatus 75 using the cylindrically curved stabilizer pad 97. It is foreseen that the modified stabilizer pad assembly 120 could also be adapted for use on the handle apparatus 1.

It is to be understood that while certain forms of the present invention have been described and illustrated herein, it is not to be limited to the specific forms or arrangement of parts described and shown.

What is claimed and desired to be secured by Letter Patent is:

1. A handle apparatus for releasable attachment to a container having opposite first and second ends and comprising:
   (a) an elongated handle member adapted to be manually grasped and having opposite first and second handle ends;
   (b) a first retainer positioned at the first end of the handle member to engage the container first end;
   (c) a latch member engaging directly with the handle member at the second end of the handle member to enable movement of the latch member relative to the handle member between a released position and a latched position;
   (d) the latch member having a second retainer positioned to engage the container second end in the latched position of the latch member;
   (e) the latch member being configured to cause deployment to latched position by engagement of the second end of the handle member with the container; and
   (f) a latch mechanism engaged between the latch member and the handle member to releasably retain the latch member in the latched position thereof to thereby releasably attach the handle apparatus to a container.

2. The handle apparatus as set forth in claim 1 wherein:
   (a) the latch member is pivotally connected to the handle member to enable pivotal movement of the latch member between the released position and the latched position.

3. The handle apparatus as set forth in claim 1 wherein:
   (a) the latch member is pivotally connected to the handle member to enable pivotal movement of the latch member between the released position and the latched position; and
   (b) a resilient member is engaged between the latch member and the handle member and normally biases the latch member toward only one of the latched position or the released position of the latch member.

4. The handle apparatus as set forth in claim 1 wherein:
   (a) the latch member includes a cam surface positioned and oriented to cause deployment of the latch member to the latched position by engagement of the second end of the handle member with an end of a container.

5. The handle apparatus as set forth in claim 1 and including:
   (a) a stabilizer pad positioned at the second end of the handle member to engage a container to reduce movement of the handle member with respect to such a container.

6. A handle apparatus for releasable attachment to a container having opposite first and second ends, the handle apparatus comprising:
   (a) an elongated handle member adapted to be manually grasped and having opposite handle ends;
   (b) a first retainer positioned at a first end of the handle member to engage the container first end;
   (c) a latch member slidably engaged with the handle member at a second end of the handle member to enable movement of the latch member relative to the handle member between a released position and a latched position;
   (d) the latch member having a second retainer positioned to engage the container second end in the latched position of the latch member; and
   (e) a latch mechanism engaged between the latch member and the handle member to releasably retain the latch member in the latched position thereof to thereby releasably attach the handle apparatus to a container; and
   (f) a cylindrical stabilizer pad positioned at the second end of the handle member to engage a container to reduce movement of the handle member with respect to such a container.

7. The handle apparatus as set forth in claim 6 and including:
   (a) a cylindrical stabilizer pad positioned at the second end of the handle member to engage a container to reduce movement of the handle member with respect to such a container.

8. The handle apparatus as set forth in claim 6 wherein:
   (a) a pawl is positioned on one of the latch member and the handle member;
   (b) a strike is positioned on the other of the latch member and the handle member; and
   (c) the pawl and strike cooperate to releasably retain the latch member in the latched position.

9. The handle apparatus as set forth in claim 6 and including:
   (a) a resilient member engaged between the latch member and the handle member and normally biases the latch member toward the released position thereof.

10. The handle apparatus as set forth in claim 6 wherein:
    (a) the latch member telescopes within the handle member.

11. A handle apparatus for releasable attachment to a container having opposite first and second ends, the handle apparatus comprising:
    (a) an elongated handle member adapted to be manually grasped and having opposite handle ends;
    (b) a first retainer positioned at a first end of the handle member to engage the container first end;
    (c) a single latch member pivotally connected directly with the handle member at a second end of the handle member to enable movement of the latch member relative to the handle member between a released position and a latched position;
    (d) the latch member including a cam surface positioned and oriented to enable deployment of the latch member to the latched position upon engagement of the second end of the handle member with an end of a container;
    (e) a resilient member engaging between the latch member and the handle member and normally biasing the latch member toward the latched position thereof; and
    (f) the latch member having a second retainer positioned to engage the container second end in the latched position of the latch member.

12. A handle apparatus for releasable attachment to a container having opposite first and second ends, the handle apparatus comprising:
    (a) an elongated handle member adapted to be manually grasped and having opposite handle ends;
    (b) a first retainer positioned at a first end of the handle member to engage the container first end;
    (c) a single latch member pivotally connected directly with the handle member at a second end of the handle member to enable movement of the latch member relative to the handle member between a released position and a latched position;

(d) a resilient member is engaged between the latch member and the handle member and normally biases the latch member toward the latched position thereof;

(e) the latch member having a second retainer positioned to engage the container second end in the latched position of the latch member;

(f) a lock member engaging with the handle member and movable between a locked position and an unlocked position;

(g) the lock member being movable to the locked position thereof to lock the latch member in the latched position thereof to releasably retain the latch member in the latched position; and (h) the lock member being movable to the unlocked position to enable the latch member to be selectively moved between the latched position and the released position thereof.

13. A handle apparatus for releasable attachment to a container having opposite first and second ends, the handle apparatus comprising:

(a) an elongated handle member adapted to be manually grasped and having opposite handle ends;

(b) a first retainer positioned at a first end of the handle member to engage the container first end;

(c) a latch member slidably engaged with the handle member at a second end of the handle member to enable movement of the latch member relative to the handle member between a released position and a latched position;

(d) the latch member having a second retainer positioned to engage the container second end in the latched position of the latch member; and (e) a latch mechanism engaged between the latch member and the handle member to releasably retain the latch member in the latched position thereof to thereby releasably attach the handle apparatus to a container; and (f) a planar stabilizer pad positioned at the second end of the handle member, the stabilizer pad having spaced apart ribs extending away from the handle member to engage a container to reduce movement of the handle member with respect to such a container.

14. A handle apparatus for releasable attachment to a container having opposite first and second ends and comprising:

(a) an elongated handle member adapted to be manually grasped and having opposite first and second handle ends;

(b) a first retainer positioned at the first end of the handle member to engage the container first end;

(c) a latch member engaging directly with the handle member at the second end of the handle member to enable movement of the latch member relative to the handle member between a released position and a latched position;

(d) the latch member having a second retainer positioned to engage the container second end in the latched position of the latch member;

(e) the latch member being configured to cause deployment to latched position by engagement of the second end of the handle member with the container;

(f) a lock member engaged with the handle member and movable between a locked position and an unlocked position;

(g) the lock member being moveable to the locked position thereof to lock the latch member in the latched position thereof to releasably retain the latch member in the latched position; and (h) the lock member being moveable to the unlocked position to enable the latch member to be selectively moved between the latched position and the released position thereof.

15. A handle apparatus for releasable attachment to a container having opposite first and second ends and comprising:

(a) an elongated handle member adapted to be manually grasped and having opposite first and second handle ends;

(b) a first retainer positioned at the first end of the handle member to engage the container first end;

(c) a latch member engaging directly with the handle member at the second end of the handle member to enable movement of the latch member relative to the handle member between a released position and a latched position;

(d) the latch member having a second retainer positioned to engage the container second end in the latched position of the latch member;

(e) the latch member being slidably engaged with the handle member to enable sliding movement between the released position and the latched position;

(f) a pawl being positioned on one of the latch member and the handle member;

(g) a strike being positioned on the other of the latch member and the handle member;

(h) the pawl and strike cooperating to releasably retain the latch member in the latched position;

(i) a spring engaged between the latch member and the handle member and biasing the latch member toward the released position thereof; and (j) the pawl including release member operable to release the pawl from the strike to enable the spring to return the latch member to the released position.

* * * * *